United States Patent
Wu et al.

(10) Patent No.: US 10,340,590 B2
(45) Date of Patent: Jul. 2, 2019

(54) DEVICE ASSEMBLY APPLIED TO MOBILE TERMINAL AND MOBILE TERMINAL

(71) Applicant: GUANGDONG OPPO MOBILE TELECOMMUNICATIONS CORP., LTD., Dongguan (CN)

(72) Inventors: Qing Wu, Dongguan (CN); Yuanbin Xiang, Dongguan (CN)

(73) Assignee: GUANGDONG OPPO MOBILE TELECOMMUNICATIONS CORP., LTD., Guangdong, Dongguan (CN)

(*) Notice: Subject to any disclaimer, the term of this patent is extended or adjusted under 35 U.S.C. 154(b) by 0 days.

(21) Appl. No.: 15/683,804

(22) Filed: Aug. 23, 2017

(65) Prior Publication Data
US 2018/0159212 A1    Jun. 7, 2018

(30) Foreign Application Priority Data

Dec. 7, 2016 (CN) .......................... 2016 1 1117055
Dec. 7, 2016 (CN) ..................... 2016 2 1340419 U

(51) Int. Cl.
| | |
|---|---|
| *G06K 9/00* | (2006.01) |
| *H01Q 1/24* | (2006.01) |
| *H01Q 1/44* | (2006.01) |
| *H01Q 9/40* | (2006.01) |
| *H01Q 21/30* | (2006.01) |

(Continued)

(52) U.S. Cl.
CPC ........... *H01Q 1/44* (2013.01); *G06K 9/00053* (2013.01); *H01Q 1/243* (2013.01); *H01Q 9/40* (2013.01); *H01Q 21/30* (2013.01); *H04B 1/0064* (2013.01); *H04M 1/026* (2013.01); *G06F 21/32* (2013.01); *H01Q 5/328* (2015.01); *H01Q 5/335* (2015.01); *H01Q 5/35* (2015.01)

(58) Field of Classification Search
CPC ............ H01Q 1/44; H01Q 21/30; H01Q 9/40; H01Q 1/243; H04B 1/0064
USPC ......................................................... 343/702
See application file for complete search history.

(56) References Cited

U.S. PATENT DOCUMENTS

| | | | |
|---|---|---|---|
| 8,249,557 B2* | 8/2012 | Xiao ....................... H04M 1/67 340/5.52 |
| 10,101,843 B2* | 10/2018 | Kim ....................... G06F 3/0416 |

(Continued)

FOREIGN PATENT DOCUMENTS

| | | |
|---|---|---|
| CN | 204760546 | 11/2015 |
| CN | 105488499 A | 4/2016 |

(Continued)

OTHER PUBLICATIONS

EPO, Office Action for EP Application No. 17192056, dated Sep. 18, 2018.

(Continued)

*Primary Examiner* — Brian K Young
(74) *Attorney, Agent, or Firm* — Hodgson Russ LLP

(57) ABSTRACT

A device assembly applied to a mobile terminal and a mobile terminal are provided. The device assembly includes a fingerprint assembly The fingerprint assembly includes a fingerprint tray, a fingerprint module, and a conductive assembly. The fingerprint tray is electrically connected to a ground of a circuit board of the mobile terminal. The fingerprint module is disposed above the fingerprint tray. The conductive assembly is disposed between the fingerprint tray and fingerprint module.

18 Claims, 4 Drawing Sheets

(51) Int. Cl.
*H04B 1/00* (2006.01)
*H04M 1/02* (2006.01)
*G06F 21/32* (2013.01)
*H01Q 5/328* (2015.01)
*H01Q 5/335* (2015.01)
*H01Q 5/35* (2015.01)

(56) References Cited

U.S. PATENT DOCUMENTS

| | | | |
|---|---|---|---|
| 10,102,409 B2 * | 10/2018 | Han | G06K 9/00 |
| 10,133,913 B2 * | 11/2018 | Zhang | G06K 9/40 |
| 2009/0257626 A1 | 10/2009 | Sherlock et al. | |
| 2010/0090909 A1 | 4/2010 | Ella | |
| 2014/0078008 A1 | 3/2014 | Kang | |
| 2015/0216024 A1 | 7/2015 | Kwong | |
| 2016/0056527 A1 | 2/2016 | Pascolini et al. | |
| 2016/0196462 A1 | 7/2016 | Jiang et al. | |

FOREIGN PATENT DOCUMENTS

| | | |
|---|---|---|
| CN | 105828590 A | 8/2016 |
| CN | 105870629 A | 8/2016 |
| CN | 106155190 A | 11/2016 |
| CN | 106550073 A | 3/2017 |
| CN | 206323420 U | 7/2017 |
| WO | 2008075133 A1 | 6/2008 |
| WO | 2016028592 | 2/2016 |

OTHER PUBLICATIONS

EPO, OA for EP application 17192056.4 (Feb. 18, 2019).
SIPO, First Office Action for CN Application No. 201611117055, Apr. 3, 2019.

* cited by examiner

DEVICE ASSEMBLY APPLIED TO MOBILE TERMINAL AND MOBILE TERMINAL

CROSS REFERENCE TO RELATED APPLICATIONS

This application claims priority to Chinese Application No. 201611117055.6 filed Dec. 7, 2016 and Chinese Application No. 201621340419.2 filed Dec. 7, 2016. The entire disclosures of the above applications are incorporated herein by reference.

BACKGROUND

Field

The present disclosure relates to the field of antenna technologies, and particularly to a deuce assembly applied to a mobile terminal, and a mobile terminal.

Background

Following the continuous development of mobile terminals, the mobile terminals can carry out more and more functions, such as photo shooting, fingerprint unlocking, fingerprint payment, etc. The functions have gradually become a standard function in mobile phones.

In present technology, a fingerprint identification module designed by most mobile terminal manufacturers, is disposed on a front of a mobile phone and is integrated with a home key of the mobile phone for convenience to a user. However. the fingerprint identification module includes a variety of sensors, which makes the fingerprint identification module large and occupy a large antenna clearance area, seriously affecting antenna performance.

DETAILED DESCRIPTION OF ILLUSTRATED EMBODIMENTS

Figure 1:
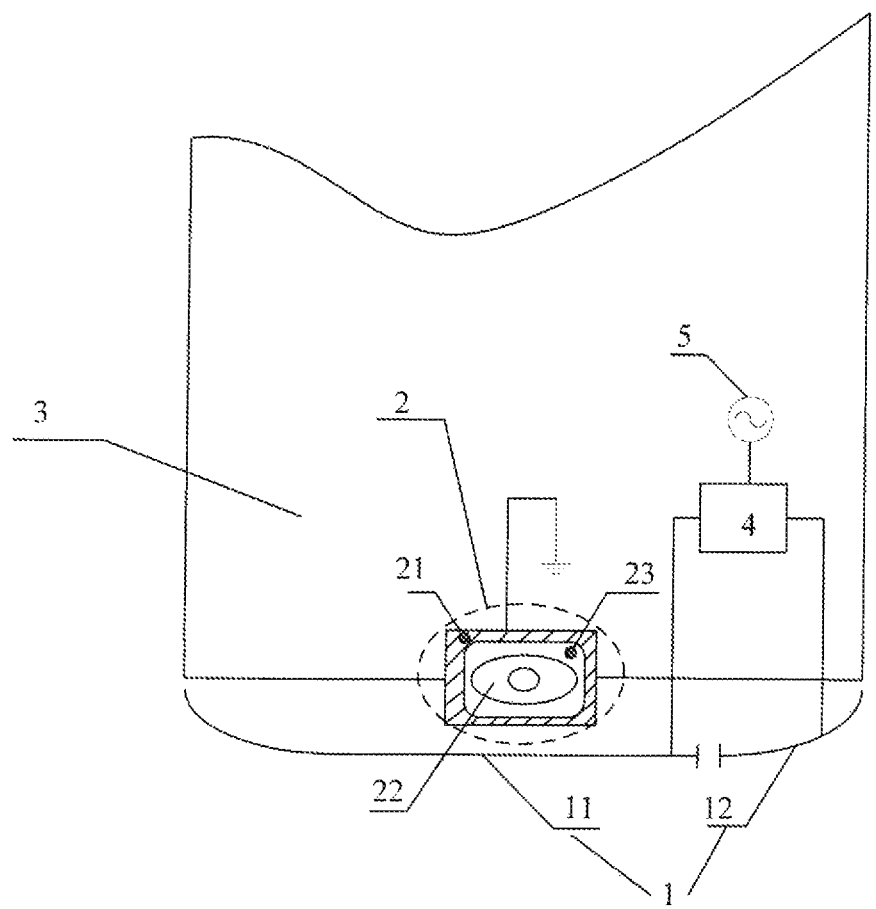
FIG. 1 is a schematic view of a device assembly applied to a mobile terminal according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure.

A mobile terminal in the embodiments of the present disclosure will be further described in detail in combination with the accompanying drawings hereinafter.

Referring to FIG. 1, FIG. 1 is a schematic view of a device assembly applied to a mobile terminal according to an embodiment of the present disclosure. The device assembly applied to the mobile terminal according to an embodiment of the present disclosure includes a fingerprint assembly 2.

The fingerprint assembly 2 includes a fingerprint tray 21, a fingerprint module 22, and a conductive assembly 23. The fingerprint tray 21 is electrically connected to a ground 3 of a circuit board of the mobile terminal. The fingerprint module 22 is disposed on the fingerprint tray 21. The conductive assembly 23 is disposed between the fingerprint tray 21 and fingerprint module 22.

In detail, the device assembly of an embodiment of the present disclosure can be applied to any mobile terminal, for example, a terminal having an antenna structure such as a mobile phone, a tablet such as an IPAD, etc., and the terminal may include a fingerprint module. FIG. 1 illustrates an example of the mobile terminal as a mobile phone.

The circuit board of the mobile terminal refers to a printed circuit board of the mobile terminal for holding an electronic device such as a memory, a processor, and an antenna circuit. The ground of the circuit board refers to a ground of an electronic circuit disposed on the circuit board, such as a ground of an antenna.

In detail, the fingerprint tray 21 may be connected to the ground 3 of the circuit board of the mobile terminal in a variety of ways, such as by a conductive fabric, a copper foil, etc.; or the fingerprint tray may be of a metallic material so that the fingerprint tray is mounted, directly on the ground 3 of the circuit board of the mobile terminal, but the embodiment is not limited hereto.

In addition, referring to FIG. 1, the device assembly further includes an antenna assembly 1. The fingerprint assembly 2 is disposed, in an area enclosed by the antenna assembly 1. The fingerprint tray 21 and the fingerprint module 22 are adjacent to the antenna assembly 1. The fingerprint assembly 2 reduces an antenna clearance area for the antenna assembly 1. It should be understood that arrangement of the fingerprint assembly 2 complicates an electromagnetic environment of the antenna assembly 1. Therefore, the device assembly of the embodiment includes the conductive module 23 disposed between the fingerprint module 22 and the fingerprint tray 21. The conductive module 23 may be, for example, a conductive fabric, a copper foil, etc. The fingerprint module 22 is efficiently and reliably connected to the ground 3 of the circuit board of the mobile terminal by the conductive module 23 and the fingerprint tray 21. Various non-linear effects generated by electromagnetic waves of the antenna assembly 1 radiated on the fingerprint module 22 are quickly returned to the ground 3, effectively avoiding problems of radiated spurious emission (RSE) and improving performance of the antenna assembly 1.

It is to be understood that the antenna assembly 1 shown in FIG. 1 may be a partial antenna of the mobile terminal. For example, for mobile phones, most of the antenna is concentrated in the top area of the mobile phone. The antenna assembly 1 shown in in FIG. 1 can be used as a supplement to the antenna of the mobile phone.

In detail, the antenna assembly 1 shown in FIG. 1 may include a first antenna 11 and a second antenna 12 as needed. The first antenna 11 and the second antenna 12 may be connected to an antenna feed 5 of the circuit board. In another embodiment, the first antenna 11 and the second antenna 12 may be connected to a diplexer 4 and the diplexer 4 is connected to the antenna feed 5 of the circuit board of the mobile terminal shown in FIG. 1.

It is to be understood that in order to expand the bandwidth covered by the antenna assembly 1 of the mobile terminal, the first antenna 11 may be a low frequency antenna as desired, for example for covering a bandwidth of 699 MHz to 960 MHz, the second antenna 12 may be a mid-high frequency antenna, for example, for covering a bandwidth of 1710 MHz to 2690 MHz, and the embodiment is not limited hereto. In other words, a frequency range of the first antenna 11 is in a range of 699 MHz to 960 MHz, and a frequency range of the second antenna 12 is in a range of 1710 MHz to 2690 MHz.

The diplexer 4 divides radiation from the antenna feed 5, radiates a mid-high frequency signal through the second antenna 12, and radiates a low frequency signal through the first antenna 11. In other embodiment, the first antenna 11 and the second antenna 12 receive signals and send the received low frequency signal or mid-high frequency signal to the diplexer 4. The signals are synthesized by the diplexer 4 and then fed back to an antenna processing circuit by the antenna feed 5 so that the antenna processing circuit analyzes the signals and sends the signals to a processor of the mobile terminal.

The embodiment of the present disclosure provides the device assembly applied to the mobile terminal. The device assembly includes the fingerprint assembly. The fingerprint tray of the fingerprint assembly is electrically connected to the ground of the mobile terminal. The fingerprint module is connected to the fingerprint tray by the conductive assembly. The fingerprint assembly is efficiently and reliably connected to the ground 3 of the circuit board of the mobile terminal, various non-linear effects generated by electromagnetic waves of the antenna assembly 1 radiated on the fingerprint assembly are quickly returned to the ground 3, greatly reducing impact caused by the fingerprint assembly occupying an antenna clearance area to the performance of the antenna assembly 1.

Figure 2:
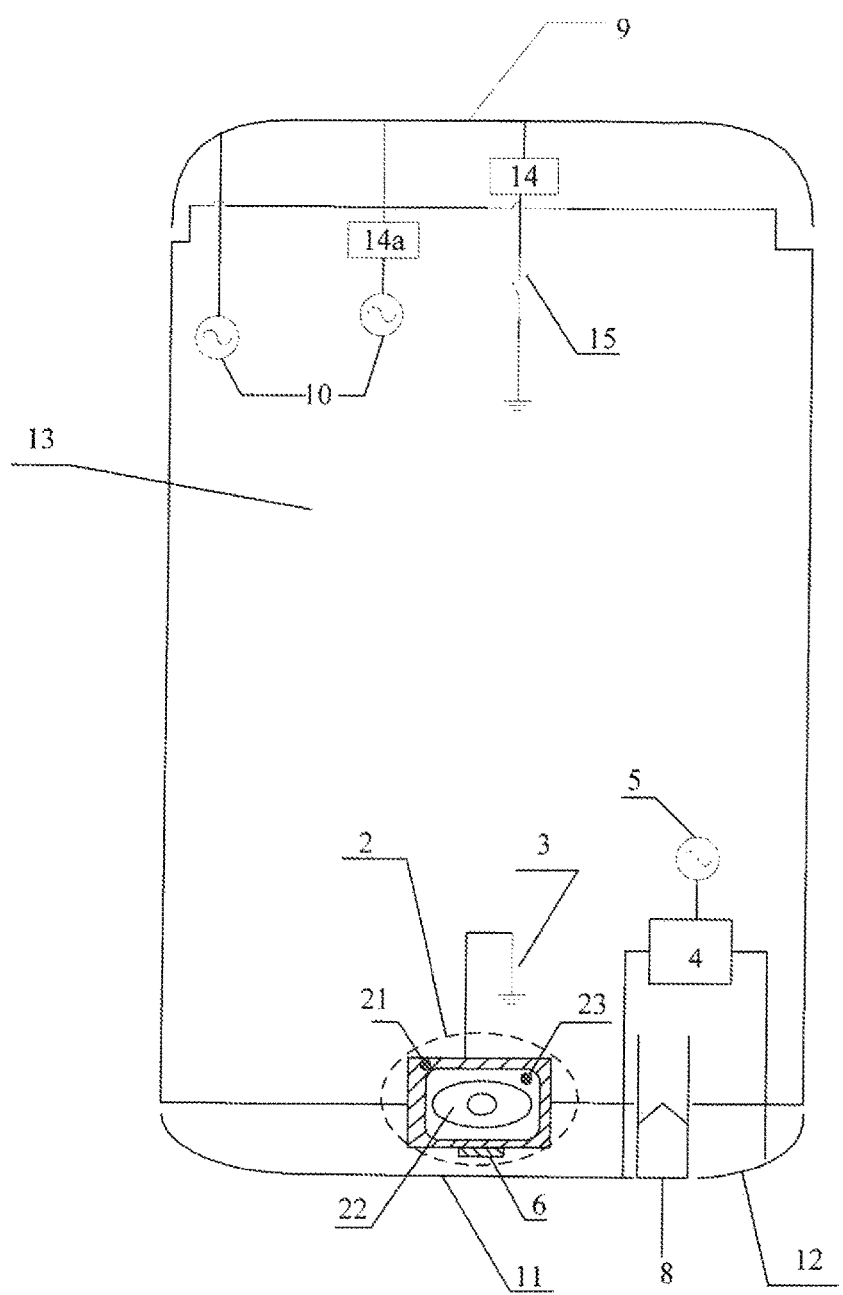
FIG. 2 is a schematic view of a device assembly applied to a mobile terminal according to another embodiment of the present disclosure.
Figure 3:
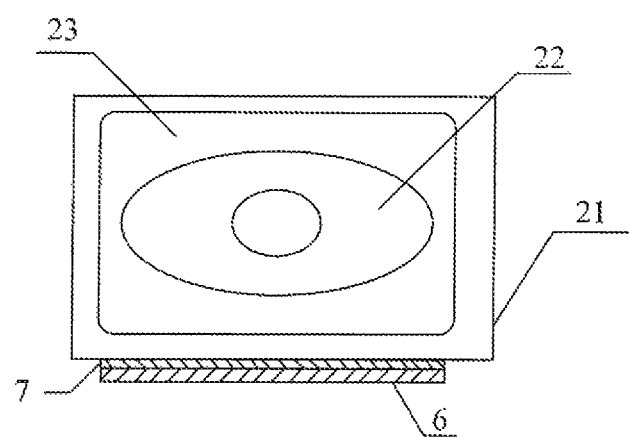
FIG. 3 is a partially enlarged view of FIG. 2.

Referring to FIG. 2 and FIG. 3, FIG. 2 is a schematic view of a device assembly applied to a mobile terminal according to another embodiment of the present disclosure and FIG. 3 is a partially enlarged view of FIG. 2. The device assembly further includes an interface 6 and an insulating layer 7 disposed between the interface 6 and the fingerprint tray 21.

It is to be noted that the interface 6 in the embodiment may be a USB interface of the mobile terminal, a headphone interface of the mobile terminal, etc., or an interface including the USB interface and the headphone interface. Number and type of the interface may be designed according to an internal circuit board of the mobile terminal, and the embodiment is not limited thereto.

Further, if the interface 6 is the USB interface, the interface 6 is used for connecting a charging circuit of the mobile terminal to an external charger. In order to prevent magnetic fields generated by an external charging current from disturbing the antenna assembly 1, in the embodiment, the insulating layer 7 is disposed between the fingerprint tray 21 and the interface 6, so that influence of the USB interface on the performance of the antenna assembly can be greatly reduced and reliability of the antenna assembly can be achieved.

It is to be understood that a length and an area of the first antenna 11 are greater than a length and an area of the second antenna 12, and therefore, the fingerprint assembly 2 in the embodiment of the present disclosure is disposed adjacent to the first antenna 11 and the first antenna 11 is disposed adjacent to the interface 6.

Further, referring to FIG. 2, the mobile terminal may further include an earphone socket 8 disposed between the first antenna 11 and the second antenna 12, In detail, in the embodiment, the first antenna 11 and the second antenna 12 are reliably separated by the earphone socket 8.

Further, referring to FIG. 2, the antenna assembly further includes a third antenna 9, at least one feed point 10, and a first matching assembly 14, the third antenna 9 is connected to the circuit board 13 of the mobile terminal by the at least one feed point 10, the first matching assembly 14 is connected between the third antenna 9 and the circuit board 13 of the mobile terminal.

In detail, the first matching assembly 14 may include a plurality of inductors and capacitances in series or in parallel, and inductance or capacitances of different inductive or capacitive branches may differ so that resonant frequencies of the different branches are different. The third antenna 9 may be combined with a different branch to cover different antenna bands.

It is to be understood that in order to further increase an antenna band of the third antenna 9, a second matching assembly 14a may also be connected in series between the feed point 10 and the third antenna 9.

The structure and parameters of the mating assembly 14a may be the same as or different from the structure and parameters of the mating assembly 14, and the embodiment is not limited thereto.

Further, in the embodiment, the first matching assembly 14 includes a plurality of matching branches and the antenna assembly includes a switch assembly 15 connected between the third antenna 9 and the first matching assembly 14 in order to make the antenna assembly cover different frequency according to the operation of the mobile terminal.

In detail, the switch assembly 15 may include a plurality of switch devices connected in series to different matching branches, respectively to turn on or turn off the different matching branches. The switch assembly 15 may be a single-pole multiple-throw (SPMT) switch, and the switch assembly 15 operates in different states to conduct different matching branches.

The embodiment of the present disclosure provides the device assembly applied to the mobile terminal. The device assembly includes the antenna assembly and the fingerprint assembly disposed adjacent to the antenna assembly. The fingerprint tray of the fingerprint assembly is electrically connected to the ground of the mobile terminal. The fingerprint module is connected to the fingerprint tray by the conductive assembly. The fingerprint assembly is efficiently and reliably connected to the ground of the mobile terminal, various non-linear effects generated by electromagnetic waves of the antenna assembly radiated on the fingerprint assembly are quickly returned to the ground of the mobile terminal, greatly reducing the impact caused by the fingerprint assembly occupying an antenna clearance area to the performance of the antenna assembly. In addition, the insulating layer disposed between the interface and the fingerprint tray, thereby greatly reducing the influence of the USB interface on the performance of the antenna assembly and ensuring the reliability of the antenna assembly.

Figure 4:
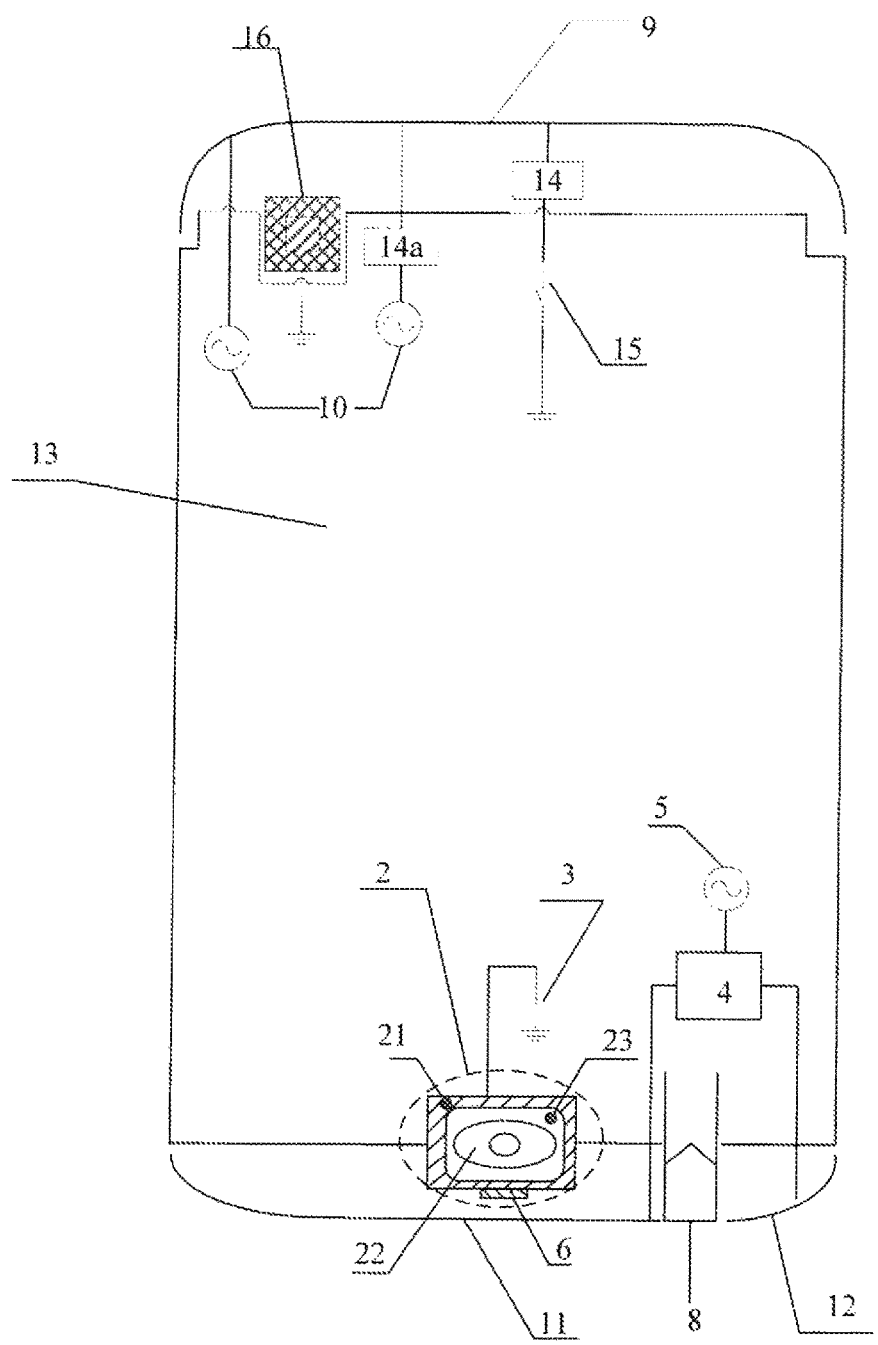
FIG. 4 is a schematic view of a mobile terminal according to embodiment of the present disclosure.

Referring to FIG. 4, FIG. 4 is a schematic view of a mobile terminal according to an embodiment of the present disclosure. The mobile terminal includes a fingerprint assembly 2, an antenna assembly, and a camera assembly 16.

Structure and positional relationship between the fingerprint assembly 2 and the antenna assembly can be referred to the detailed description of the above embodiments and it will not be described again.

In detail, the camera assembly 16 may be disposed at any position of the mobile terminal, for example, the camera assembly 16 is disposed below the third antenna 9 shown in FIG. 4.

It should be noted that the camera assembly 16 divides an antenna clearance area corresponding to the third antenna 9 into different areas. In order to reduce the influence of the camera assembly 16 on the antenna assembly, the camera assembly 16 is also reliably connected to the ground of the mobile terminal, so as to ensure that various, non-linear effects generated by electromagnetic waves of the antenna assembly radiated on the camera assembly are quickly returned to the ground of the mobile terminal, greatly reducing the impact of the camera assembly on the performance of the antenna assembly.

In the description of the present disclosure, it should be understood that terms such as "center," "longitudinal," "lateral," "length," "width," "thickness," "upper," "lower," "front," "rear," "left," "right," "vertical," "horizontal," "top," "bottom," "inside," "outside," "clockwise," "counterclockwise," "axial," "radial," "circumferential" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, unless specified or limited otherwise, it should be noted that, terms "mounted," "connected," "coupled," and "fastened," etc. may be understood broadly, such as permanent connection or detachable connection, mechanical connection or electronic connection, direct connection or indirect connection via intermediary inner communication or interreaction between two elements. A person skilled in the art should understand the specific meanings in the present disclosure according to specific situations.

In the description of the present disclosure, unless specified or limited otherwise, it should be noted that, a structure in which a first feature is "on" a second feature may include an embodiment in which the first feature directly contacts the second feature, and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation greater than the sea, level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or on bottom or the second feature, or just means that the first feature has a sea level elevation less than the sea level elevation of the second feature.

In the description of this specification, the description of the terms "one embodiment," "some embodiments," "examples," "specific examples," or "some examples," etc., means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to a person skilled in the art that different embodiments or examples described in this specification, as well as features of different embodiments or examples, may be combined without contradictory circumstances.

The foregoing descriptions are merely exemplary embodiments of the present disclosure, rather than limiting the present disclosure. Various modifications and alterations may be made to the present disclosure for a person skilled in the art. Any modification, equivalent substitution, improvement or the like made within the spirit and principle of the present disclosure shall fall into the protection scope of the present disclosure.

What is claimed is:

1. A device assembly applied to a mobile terminal comprising a fingerprint assembly; wherein the fingerprint assembly comprises:
    a fingerprint tray electrically connected to a ground of a circuit board of the mobile terminal;
    a fingerprint module disposed on the fingerprint tray;
    a conductive assembly disposed between the fingerprint tray and the fingerprint module; and
    an antenna assembly, wherein the fingerprint assembly is disposed in an area enclosed by the antenna assembly.

2. The device assembly as claimed in claim 1, wherein the conductive assembly is a conductive fabric or a copper foil.

3. The device assembly as claimed in claim 1, further comprising an interface and an insulating layer disposed between the interface and the fingerprint tray.

4. The device assembly as claimed in claim 1, wherein the antenna assembly comprises a first antenna, a second antenna, and a diplexer connected to the first antenna and the second antenna, and the diplexer is connected to an antenna feed of the circuit board.

5. The device assembly as claimed in claim 4, wherein the first antenna is a low frequency antenna, the second antenna is a mid-high frequency antenna, a frequency range of the first antenna is in a range of 699 MHz to 960 MHz, and a frequency range of the second antenna is in a range of 1710 MHz to 2690 MHz.

6. The device assembly as claimed in claim 4, wherein a length and an area of the first antenna are greater than a length and an area of the second antenna.

7. The device assembly as claimed in claim 4, further comprising an earphone socket disposed between the first antenna and the second antenna.

8. The device assembly as claimed in claim 7, wherein the first antenna and the second antenna are separated by the earphone socket.

9. The device assembly as claimed in claim 1, wherein the fingerprint tray is a metal tray.

10. The device assembly as claimed in claim 4, wherein the fingerprint assembly is disposed adjacent to the first antenna.

11. The device assembly as claimed in claim 4, further comprising an interface, wherein the first antenna is disposed adjacent to the interface.

12. The device assembly as claimed in claim 4, wherein the antenna assembly further comprises a third antenna, at least one feed point, and a first matching assembly, the third antenna is connected to the circuit board of the mobile terminal by the at least one feed point, the first matching assembly is connected between the third antenna and the circuit board.

13. The device assembly as claimed in claim 12, wherein the antenna assembly further comprises a second matching assembly connected in series between the at least one feed point and the third antenna.

14. The device assembly as claimed in claim 12, wherein the antenna assembly further comprises a switch assembly connected between the third antenna and the first matching assembly.

15. A mobile terminal, comprising:
a device assembly; and
a camera assembly, the device assembly comprising a fingerprint assembly, wherein the fingerprint assembly comprises:
a fingerprint tray electrically connected to a ground of a circuit board of the mobile terminal;
a fingerprint module disposed on the fingerprint tray;
a conductive assembly disposed between the fingerprint tray and fingerprint module; and
an antenna assembly, wherein the fingerprint assembly is disposed in an area enclosed by the antenna assembly.

16. The mobile terminal as claimed in claim 15, wherein the antenna assembly comprises a first antenna, a second antenna, and a diplexer connected to the first antenna and the second antenna, the diplexer is connected to an antenna feed of the circuit board.

17. The mobile terminal as claimed in claim 15, further comprising an interface, wherein the first antenna is disposed adjacent to the interface.

18. The mobile terminal as claimed in claim 15, wherein the antenna assembly further comprises a third antenna, at least one feed point, and a first matching assembly, the third antenna is connected to the circuit board of the mobile terminal by the at least one feed point, the first matching assembly is connected between the third antenna and the circuit board, and the camera assembly is disposed below the third antenna and connected to the ground of the circuit board.

\* \* \* \* \*